United States Patent
Higashiyama

(10) Patent No.: US 8,027,754 B2
(45) Date of Patent: Sep. 27, 2011

(54) ON-VEHICLE DEVICE

(75) Inventor: Satoru Higashiyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/915,903

(22) Filed: Oct. 29, 2010

(65) Prior Publication Data

US 2011/0046871 A1 Feb. 24, 2011

Related U.S. Application Data

(63) Continuation of application No. 11/505,916, filed on Aug. 18, 2006, now Pat. No. 7,848,862.

(30) Foreign Application Priority Data

Aug. 25, 2005 (JP) ................................. 2005-244867

(51) Int. Cl.
*G06F 17/00* (2006.01)
(52) U.S. Cl. .......................................................... 701/1
(58) Field of Classification Search .................... 701/36, 701/200, 208, 211, 1; 340/995.1
See application file for complete search history.

(56) References Cited

U.S. PATENT DOCUMENTS

| 4,939,652 | A | | 7/1990 | Steiner |
| 5,027,296 | A | * | 6/1991 | Yamaguchi et al. .......... 702/159 |
| 5,916,287 | A | | 6/1999 | Arjomand et al. |
| 6,081,205 | A | * | 6/2000 | Williams .................... 340/932.2 |
| 6,282,469 | B1 | | 8/2001 | Rogers et al. |
| 6,735,503 | B2 | | 5/2004 | Ames |
| 6,782,392 | B1 | | 8/2004 | Weinberger et al. |
| 7,519,458 | B2 | | 4/2009 | Buckley |

FOREIGN PATENT DOCUMENTS

| JP | A2001-22482 | 1/2001 |
| JP | A2001-243707 | 9/2001 |
| JP | 2003-330872 | 11/2003 |
| JP | 2004-094755 | 3/2004 |
| JP | 2004-192299 | 7/2004 |

OTHER PUBLICATIONS

Office Action issued May 31, 2011, in Japanese Application No. 2005-244867, filed Aug. 25, 2005 without an English Translation.

* cited by examiner

*Primary Examiner* — Yonel Beaulieu
(74) *Attorney, Agent, or Firm* — Oblon, Spivak, McClelland, Maier & Neustadt, L.L.P.

(57) ABSTRACT

An on-vehicle device with a storage unit that includes a transfer unit that transfers data stored in the storage unit to another on-vehicle device of equal capability that is also equipped with a storage unit. In the on-vehicle device, the transfer unit is configured by a data transfer jack provided to each of the on-vehicle device and the another on-vehicle device, and a data transfer cable for connecting the transfer jacks.

23 Claims, 4 Drawing Sheets

ON-VEHICLE DEVICE

CROSS REFERENCE TO RELATED APPLICATIONS

The present application is a continuation application of and claims the benefit of priority under 35 U.S.C. §120 from U.S. application Ser. No. 11/505,916, filed Aug. 18, 2006, now U.S. Pat. No. 7,848,862, which is based upon and claims the benefit of priority under 35 U.S.C. §119 from prior Japanese Patent Application No. 2005-244867, filed in the Japanese Patent Office on Aug. 25, 2005, the entire contents of each of which is incorporated herein by reference.

BACKGROUND OF THE INVENTION

1. Field of the Invention

The present invention relates to on-vehicle devices and, more specifically, to an on-vehicle device equipped with a storage unit.

2. Description of the Related Art

Vehicles are generally equipped with an on-vehicle audio device to the portion of an installment panel or a console panel. Users can have fun listening to music by the audio device reproducing CDs (compact disks), for example, and by speakers or others incorporated in doors outputting the reproduced audio. Assuming that the audio device is equipped therein with a large-capacity memory exemplified by a hard disk or others, the users write and store their favorite music data into the hard disk, and the music becomes available for the users to listen when the written music data is reproduced through reproduction of the hard disk.

With a vehicle navigation device incorporated on the installment panel or the console panel, and with a display unit of the vehicle navigation device indicating the position of the vehicle by an arrow or others on the map, the users can know correctly the route to the destination. If such a vehicle navigation device is equipped with a large-capacity memory exemplified by a hard disk or others, it becomes possible to input any data customized by the users' preferences, e.g., marks on the map, and address book.

If such a vehicle audio device or a vehicle navigation device is replaced with a new one respectively, it means that the data written on the hard disk of the current device will be discarded. If the data is to be transferred to a recording medium of the new vehicle audio device or vehicle navigation device, before such data transfer, the data on the hard disk of the current device will have to be once moved to any other recording medium, e.g., any portable storage unit of CD-ROM (Compact Disc-Read-Only Memory), semiconductor memory, or others.

If the data is to be discarded on the hard disk of the current device, it is necessary to take the trouble to write the data again to the hard disk of the new device. If the data is to be moved to any portable recording medium, in accordance with some capacity of the memory, the need arises to use the recording medium repeatedly for several times for moving the data. Such a trouble caused by moving the data is considered a drawback.

Patent Document 1 (JP-A-2004-94755) describes a data transfer device that is configured to include: a unit for reading only control information and any predetermined portion required for data access on a storage device; and a unit for transferring thus read control information and predetermined portion to another storage device for writing and copying thereto. Such a data transfer device implements high-speed transfer of a large amount of data while preventing head seeking or others from frequently occurring. This is achieved by reading and transferring only the control information and any predetermined portion of the storage device for writing them into another storage device being a transfer destination, and by copying only the control information and the predetermined portion needed for data access with no concern for files on the storage device.

SUMMARY OF THE INVENTION

The problem with such a data transfer device is that the data transfer is limited to between computers sharing the transfer function of the same protocol exemplified by a general-purpose communications protocol such as FTP (File Transfer Protocol) or NFS (Network File System) protocol, and the data transfer is not about transferring customized data in on-vehicle devices.

Patent Document 2 (JP-A-2003-330872)

There is thus a need for an on-vehicle device with which, when exchanging the current on-vehicle device for a new one, data writing can be easily performed from a storage unit of the current on-vehicle device to a storage unit of the new on-vehicle device.

There is another need for an on-vehicle device with which, when exchanging a current vehicle audio device for a new one, writing of customized data can be easily performed from a storage unit of the current vehicle audio device to a storage unit of the new vehicle audio device.

There is still another need for an on-vehicle device with which, when exchanging a current vehicle navigation device for a new one, transferring of customized data can be easily performed from a storage unit of the current vehicle navigation device to a storage unit of the new vehicle navigation device.

There is still another need for an on-vehicle device with which, when exchanging the current on-vehicle device for a new one, there is no more need to write again users' preferred data or customized data to a storage unit of the new on-vehicle device.

There is still another need for an on-vehicle device with which, when exchanging the current on-vehicle device for a new one, there is no more need to make a power supply and to remove the current on-vehicle device from the vehicle to transfer user-customized data stored in a storage unit of the current on-vehicle device to a storage unit of the new on-vehicle device.

These needs of the present invention will become more apparent from the following detailed description of the technical scope and embodiments of the present invention.

The present invention is directed to an on-vehicle device with a storage unit, including a transfer unit that transfers data stored in the storage unit to another on-vehicle device of equal capability that is also equipped with a storage unit. In the on-vehicle device, the transfer unit is configured by a data transfer jack provided to each of the on-vehicle devices, and a data transfer cable for connecting the transfer jacks.

In the on-vehicle device, the data transfer cable may make a power supply for driving at least the storage unit of another on-vehicle device, or may be of USB (Universal Serial Bus) type. The on-vehicle device may be provided with an operation unit for data transfer, and when the operation unit is operated, the transfer unit may start the data transfer. The on-vehicle device may be provided also with a display unit, and when the transfer unit completes data transfer, the display unit may make a display telling that the data transfer is completed. In the on-vehicle device, the storage unit may be a hard disk. The on-vehicle device may be a vehicle audio device, or a vehicle navigation device.

A preferable embodiment of the present invention is directed to an on-vehicle device, e.g., vehicle audio device or vehicle navigation device, equipped with a large-capacity memory, e.g., hard disk. The on-vehicle device is provided with a data transfer unit exemplified by USB connection or others. With the on-vehicle device, information data including music data, map data, or others can be exchanged with a large-capacity memory, e.g., hard disk, of another on-vehicle device by the data transfer unit, e.g., USB connection. With such an on-vehicle device, for data acquisition from a hard disk of a current on-vehicle device, USB connection provides a power supply for data acquisition so that a new on-vehicle device is no more required to have any other power supply, e.g., battery.

The on-vehicle device equipped with a large-capacity memory such as hard disk originally carries therein a lot of data, including music customized to match user's tastes, marks on the map, registration data, and others. If the user decides to exchange his or her current on-vehicle device for a new one, the user has to discard the data in the current on-vehicle device or take the trouble to transfer the huge amount of data to the new on-vehicle device, and this is considered a burden on the user. Such a burden is favorably eased with an USB connection, for example, enabling data transfer in the hard disk. This thus saves the trouble of installing the data again, and the user can listen to music as always with the exchanged new on-vehicle device. If power supply is made through the USB connection for data transfer, there is no more need to newly provide a battery or others for power supply. With the current on-vehicle device remain equipped in the vehicle, data transfer can be thus performed to a new on-vehicle device which receives power supply through USB connection.

The present invention is mainly directed to an on-vehicle device with a storage unit, including a transfer unit that transfers data stored in the storage unit to another on-vehicle device of equal capability that is also equipped with a storage unit. In the on-vehicle device, the transfer unit is configured by a data transfer jack provided to each of the on-vehicle devices, and a data transfer cable for connecting the transfer jacks.

For exchange of a current on-vehicle device for a new one, the on-vehicle device configured as above enables to transfer the data stored in the storage unit of the current on-vehicle device to the storage unit of the new on-vehicle device via the transfer unit, which is configured by the data transfer jack and the data transfer cable. As such, any information written to the storage unit of the current on-vehicle device can be transferred for writing to the storage unit of the new on-vehicle device.

DESCRIPTION OF THE PREFERRED EMBODIMENTS

Figure 1:
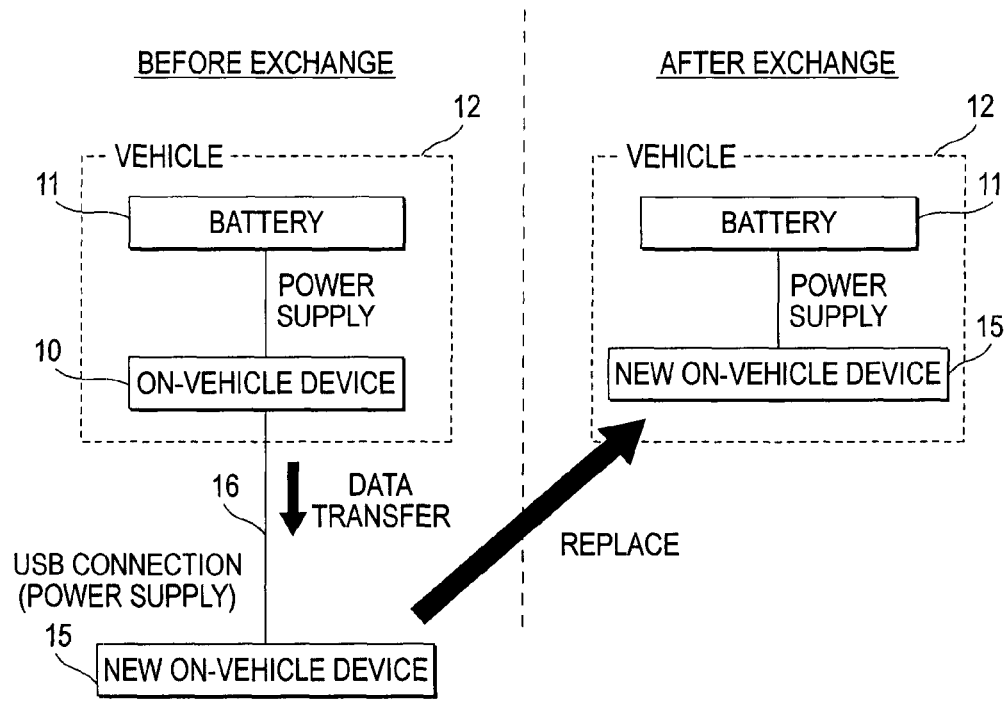
FIG. 1 is a block diagram showing the operation of exchanging on-vehicle devices.

The present invention is described by embodiments shown in the accompanying drawings. FIG. 1 shows the principle of data transfer in an on-vehicle device in an embodiment of the present invention, i.e., shows data transfer when a current on-vehicle device 10 is exchanged for a new on-vehicle device 15. The on-vehicle device 10 configured by a vehicle audio device is driven by a battery 11, and is equipped in a vehicle 12. That is, the vehicle audio device 10 is driven by the battery 11 for vehicle use. This on-vehicle device 10 is provided therein with a hard disk, and a user writes his or her favorite music to this hard disk. The data in such a hard disk of the current on-vehicle device 10 can become available, by an USB cable 16, for the new on-vehicle device 15 equipped also with a hard disk. At the time of such data acquisition, the USB cable 16 makes a power supply from the current on-vehicle device 10 to the new on-vehicle device 15 so that there is no more need to connect the battery 11 or any other power supply to the new on-vehicle device 15.

If the current on-vehicle device 10 of FIG. 1 is exchanged for the new on-vehicle device 15, it generally means that the data on the hard disk of the current on-vehicle device 10 will be discarded, or the data will be transferred via any portable recording medium, e.g., CD-ROM or semiconductor memory. If the data is discarded, the need arises to enter again another data or record again any music. If with a recording medium, the data transfer has to be made repeatedly for several times for moving the data, and this is a burden on the user.

If a data transfer unit taken charge of data transfer or others is activated through USB connection, power supply can be made through the USB connection. If with such power supply, with the current on-vehicle device 10 remain equipped in the vehicle, and with the current on-vehicle device 10 driven by the battery 11 by starting the engine of the vehicle, the data can be transferred to the hard disk of the new on-vehicle device 15. If an on-vehicle monitor is equipped, the user may know the progress of data transfer by a signal coming from the current on-vehicle device 10 to the monitor to indicate whether the data transfer is started or ended. After the data transfer is completed, the current on-vehicle device 10 is removed, and the new on-vehicle 15 connected with the battery 11 is equipped to the vehicle. This favorably saves the user's trouble, i.e., entering again the data after the previous data is discarded, or transferring the data using a recording medium. The user thus can listen to music in the vehicle as always with the exchanged new on-vehicle device. Note here that the new on-vehicle device often has the format or protocol including the functions of the current on-vehicle device. Therefore, even if the format or protocol is updated to some degree, the data transfer is not interrupted.

Figure 2:
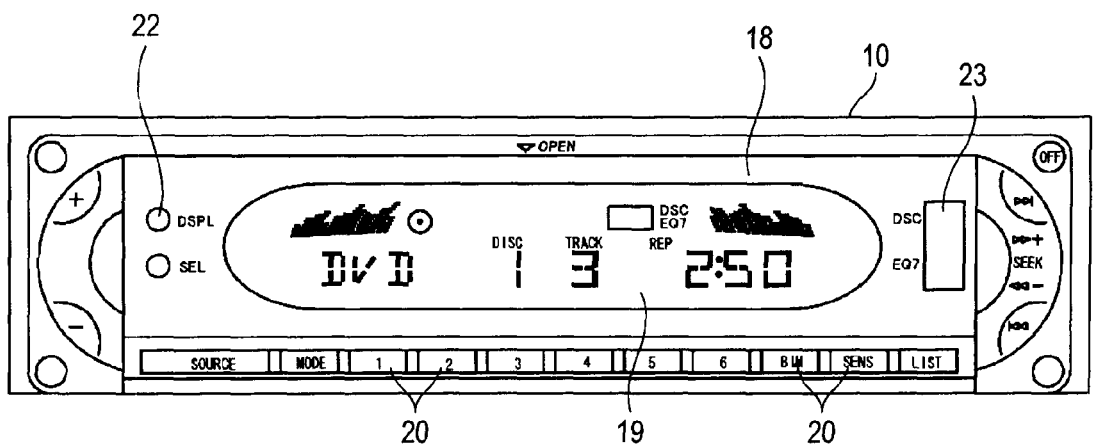
FIG. 2 is a front view of the front panel of an on-vehicle device.

FIG. 2 shows a front panel 18 of the current on-vehicle device 10 configured by a vehicle audio device. This front panel 18 includes a display panel 19, and the lower portion of the display panel 19 is provided with a plurality of operation switches 20. On the left side of the display panel 19 of the front panel 18, a data transfer button 22 is attached, and on the right side thereof, an USB jack 23 is attached.

Figure 3:
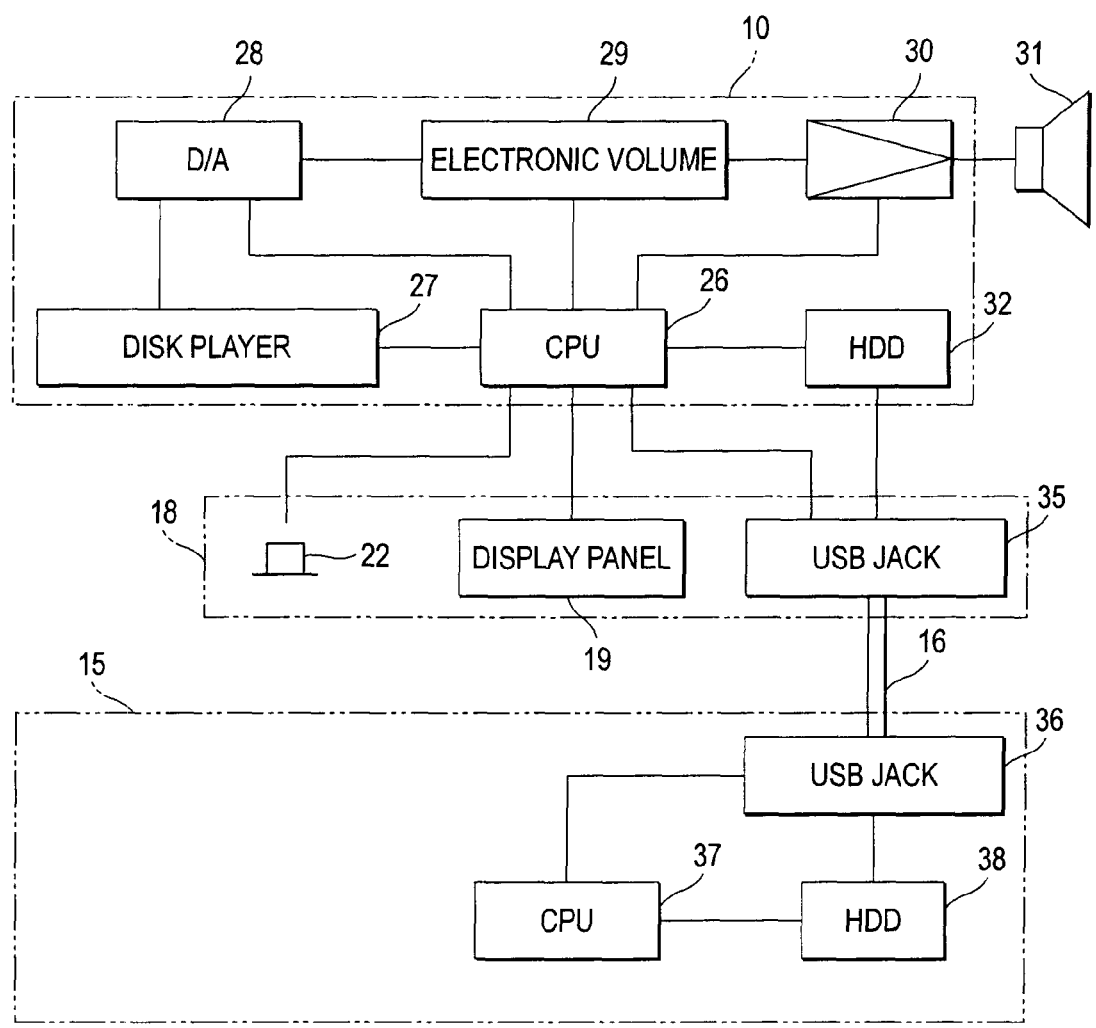
FIG. 3 is a block diagram showing the system configuration of a vehicle audio device.

FIG. 3 shows the system configuration of such a vehicle audio device 10, and this vehicle audio device is provided with a CPU (Central Processing Unit) 26 for control application. The CPU 26 is connected with both a disk player 27 that outputs audio source data, and a D/A (Digital/Analog) converter 28. On the output end of the D/A converter 28, an amplifier 30 is connected via an electronic volume 29, and an output of the amplifier 30 is directed to a speaker 31. The vehicle audio device 10 is equipped with a hard disk 32 for writing thereinto any user-preferred music or others.

The front panel 18 of the vehicle audio device 26 is attached with the display panel 19 of FIG. 2, and is connected to the CPU 26. The data transfer button 22 provided on the side of the display panel 19 is connected to the CPU 26. On the left side portion of the display panel 19, an USB jack 35 is connected. This USB jack 35 is connected to an USB jack 36 of the new on-vehicle device 15 via the USB cable 16. The USB jack 36 is connected to a CPU 37, and the CPU 37 is connected to a hard disk 38.

By referring to FIG. 4, described next is the data transfer operation when the current vehicle audio device 10 of such a configuration is removed and is exchanged for the new vehicle audio device 15. First of all, the USB cable 16 is used to establish a connection between the USB jack 35 of the current vehicle audio device 10 and the USB jack 36 of the new vehicle audio device 15. When the data transfer button 22 of the front panel 18 is then depressed, the CPU 26 issues a command for data writing, i.e., data in the hard disk 32 of the current vehicle audio device 10 is written to the hard disk 38 of the new vehicle audio device 15 via the USB jacks 35 and 36 and the USB cable 16. During such data writing, The CPU 26 makes a display telling that the data transfer is now in progress at the lower portion of the display panel 19. The CPU 26 determines whether the data transfer is completed or not, and when determining that the data transfer is through, the CPU 26 makes a display telling that the data transfer is now completed at the lower portion of the display panel 19. With such a display, the user can acknowledge that the data transfer is done from the hard disk 32 of the current vehicle audio device 10 to the hard disk 38 of the new vehicle audio device 15, and thus the user accordingly removes the USB cable 16.

With an USB connection using the USB cable 16, the maximum current value can be generally kept to 500 mA so that the CPU 37 and the hard disk 38 of the new vehicle audio device 15 can be both driven. This thus enables data transfer from the current vehicle audio device 10 to the new vehicle audio device 15 with no specific power supply to the new on-vehicle device 15.

By referring to FIG. 5, described next is another embodiment in which the on-vehicle devices 10 and 15 are both a vehicle navigation device. The vehicle navigation device 10 is equipped with a CPU 41, which is connected with a positioning device 42, and a map data disk player 43. The CPU 41 exercises control over a driver 44, which makes the display panel 45 display thereon the position of the vehicle on the map. For such display, the output of the map data disk player 43 is overlaid with the position information of the positioning device 42. The CPU 41 is equipped with a hard disk 46 for storage of any customized marks on the map, registration data, and others.

The vehicle navigation device is equipped with a front panel 48 on which a data transfer button 49 and an USB jack 50 are provided. The USB jack 50 is connected to an USB jack 52 of the new vehicle audio device 15 by an USB cable 51. The USB jack 52 of the new vehicle navigation device 15 is connected with both a CPU 53 and a hard disk 54.

Figure 4:
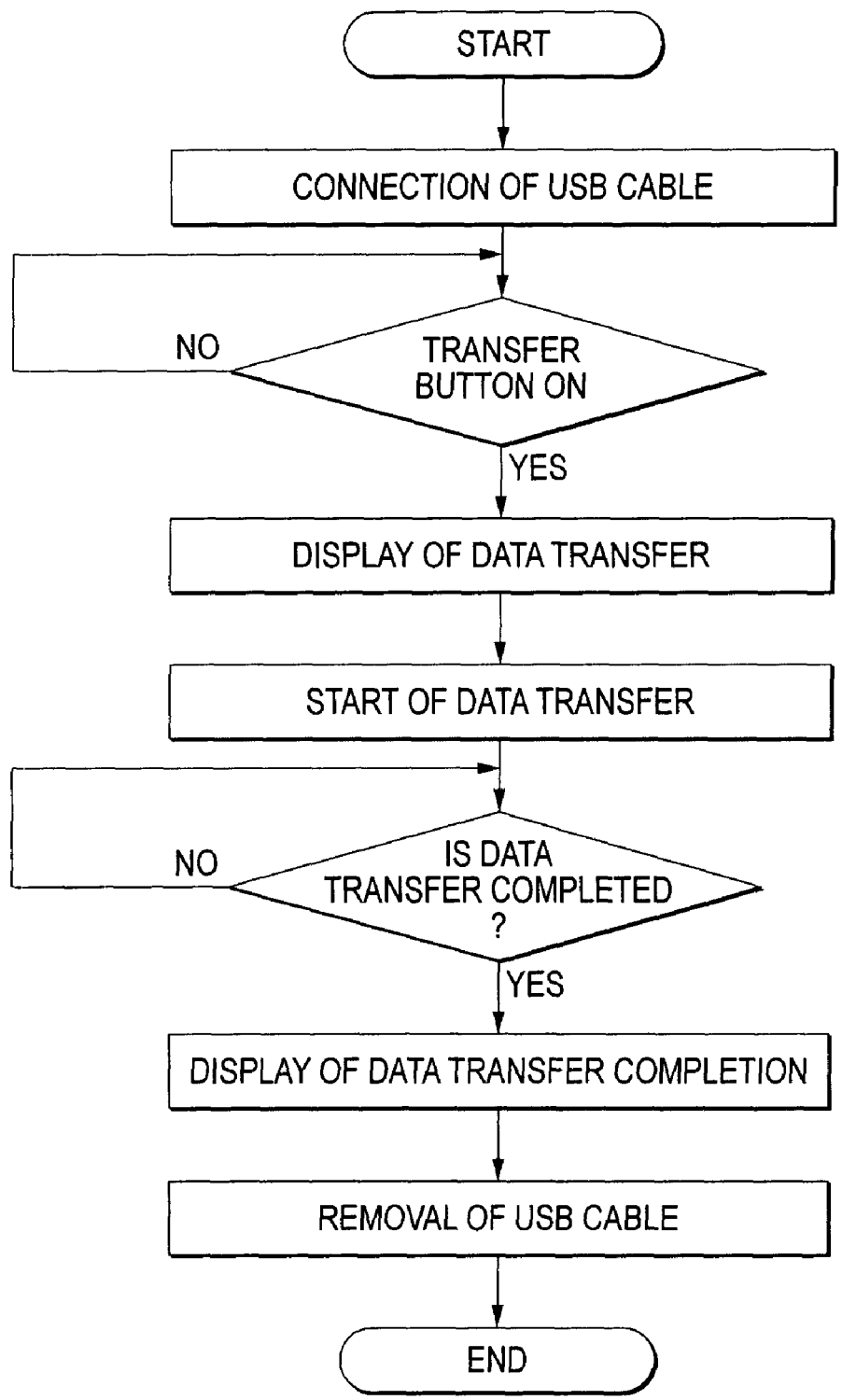
FIG. 4 is a flowchart showing the operation in the vehicle audio device at the time of data transfer.
Figure 5:
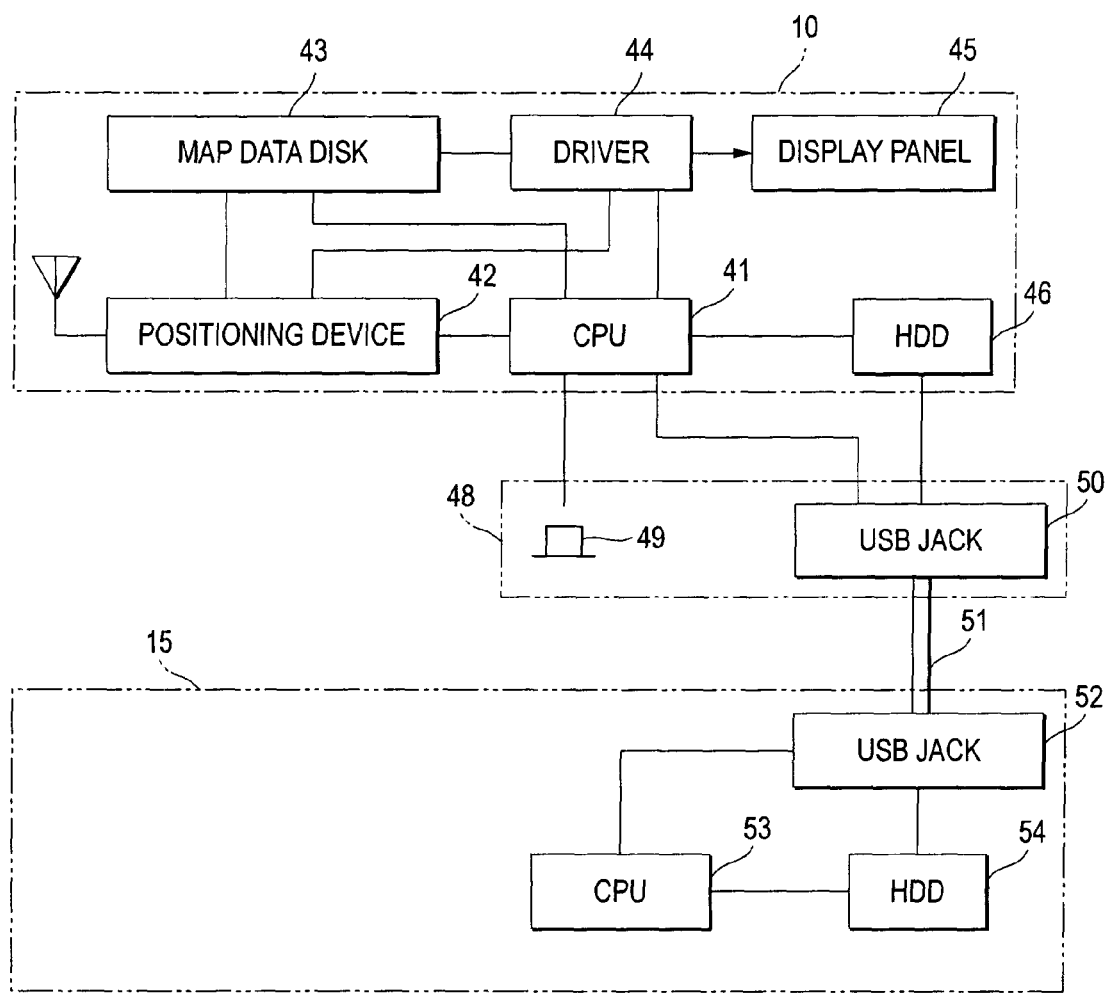
FIG. 5 is a block diagram showing the system configuration of a vehicle navigation device.

Also with such a configuration, as shown in FIG. 5, after the USB cable 51 establishes a connection between the USB jack 50 of the current vehicle navigation device 10 and the USB jack 52 of the new vehicle navigation device 15, by depressing the data transfer button 49 on the front panel 48, any customized data can be transferred with ease from the hard disk 46 of the current vehicle navigation device 10 to the hard disk 54 of the new vehicle navigation device 15 via the USB cable 51 in the procedure of the flowchart of FIG. 4. Once the data transfer is completed as such, the current on-vehicle device 10 is removed from the vehicle and the new vehicle navigation device 15 is equipped at the same position. The new vehicle navigation device 15 then makes navigation displays using the data, as it is, that has been written in the hard disk 46 of the current vehicle navigation device 10.

While the invention has been described in detail by the shown embodiments, the foregoing description is in all aspects illustrative and not restrictive. It is understood that numerous other modifications and variations can be devised without departing from the scope of the invention. For example, the data to be transferred from the hard disk 32 of the current on-vehicle device 10 to the hard disk 38 of the new on-vehicle device 15 is not restrictive to the data as described in the foregoing, and may vary in type. The invention is not restrictive to the vehicle audio device or the vehicle navigation device, and is surely applicable widely to various other types of on-vehicle device.

The present invention is applicable to audio devices and navigation devices all for vehicle use.

It should be understood by those skilled in the art that various modifications, combinations, sub-combinations and alterations may occur depending on design requirements and other factors insofar as they are within the scope of the appended claims or the equivalents thereof.

What is claimed is:

1. A device comprising:
a storage device; and
a transfer unit that transfers data stored in the storage device to another device and provides a power supply for the another device through a data transfer cable.

2. The device according to claim 1, further comprising:
an operation unit that, when operated, starts the data transfer by the transfer unit; and
a display unit to display a visual notification that the data transfer is completed when the transfer unit completes the data transfer.

3. The device according to claim 1, wherein
the data transfer cable is a Universal Serial Bus (USB) cable.

4. The device according to claim 1, wherein
the storage device is a hard disk.

5. The device according to claim 1, wherein
the device is a audio device.

6. The device according to claim 1, wherein
the device is a navigation device.

7. The device according to claim 1, wherein
the data stored in the storage unit and transferred by the transfer unit is audio data.

8. The device according to claim 1, wherein
the data stored in the storage unit and transferred by the transfer unit is map data.

9. A device comprising:
storage means for storing data;
transfer means for transferring data stored in the storage means to another device by a data transfer cable; and
power supply means for supplying power to the another device by the data transfer cable.

10. The device according to claim 9, further comprising:
operation means for, when operated, starting the data transfer by the transfer means; and display means for displaying a visual notification that the data transfer is completed when the transfer means completes the data transfer.

11. The device according to claim 9, wherein the data transfer cable is a Universal Serial Bus (USB) cable.

12. The device according to claim 9, wherein the storage means includes a hard disk.

13. The device according to claim 9, wherein the data stored in the storage means and transferred by the transfer means is audio data.

14. The device according to claim 9, wherein the data stored in the storage means and transferred by the transfer means is map data.

15. A method comprising:
transferring data stored in a storage unit of a first device to a second device by a data transfer cable; and
supplying power from the first device to the another device, for the transferring of data, by the data transfer cable.

16. The method according to claim 15, further comprising:
starting, when an operation unit of the first device is operated, the transferring of data; and
displaying a visual notification, on the first device, that the transferring of data is completed when the first device completes the transferring of data.

17. The method according to claim 15, wherein the data transfer cable is a Universal Serial Bus (USB) cable.

18. The method according to claim 15, wherein the storage unit includes a hard disk.

19. The method according to claim 15, wherein the data stored in the storage unit and transferred in the transferring of data is audio data.

20. The method according to claim 15, wherein the data stored in the storage unit and transferred in the transferring of data is map data.

21. The device according to claim 1, wherein the transfer unit transfers the data, by the data transfer cable, to the another device while the data transfer cable provides the power supply for the another device.

22. The device according to claim 1, wherein the device and the another device are not externally-supplied power.

23. The device according to claim 1, wherein the power supply for the another device drives at least a storage device of the another device which stores the transferred data.

* * * * *